US009858552B2

(12) United States Patent
Kowalkiewicz et al.

(10) Patent No.: US 9,858,552 B2
(45) Date of Patent: Jan. 2, 2018

(54) SYSTEMS AND METHODS FOR AUGMENTING PHYSICAL MEDIA FROM MULTIPLE LOCATIONS

(75) Inventors: Marek Kowalkiewicz, Moggill (AU); Alexander Dreiling, Kelvin Grove (AU); Christian Janiesch, South Brisbane (AU); Melissa Adkins, Springwood (AU); Dawid Grzegorz Weckowski, North Sydney (AU); Mark Holmes, Chapel Hill Brisbane (AU)

(73) Assignee: SAP AG, Walldorf (DE)

( * ) Notice: Subject to any disclaimer, the term of this patent is extended or adjusted under 35 U.S.C. 154(b) by 482 days.

(21) Appl. No.: 13/160,996

(22) Filed: Jun. 15, 2011

(65) Prior Publication Data
US 2012/0324372 A1 Dec. 20, 2012

(51) Int. Cl.
*G06Q 10/10* (2012.01)

(52) U.S. Cl.
CPC ......... *G06Q 10/103* (2013.01); *G06Q 10/101* (2013.01)

(58) Field of Classification Search
CPC .... G06F 3/0481; G06F 3/0486; G06F 3/0488; G06F 13/14; G06F 3/0482; G06F 13/102; G06F 17/30893; G06F 21/6218; G06F 3/04815; G06F 3/04842; G06F 3/04845; G06F 3/04847; G06F 3/1203; G06F 3/126; G06F 3/1292; G06F 3/1446; G06F 3/16; G06F 9/4443; G06F 13/385; G06F 17/212; G06F 17/30289; G06F 21/34; G06F 21/45; G06F 3/011
USPC ........................................................ 715/753
See application file for complete search history.

(56) References Cited

U.S. PATENT DOCUMENTS

| 6,388,654 | B1* | 5/2002 | Platzker et al. | 345/156 |
|---|---|---|---|---|
| 6,674,426 | B1* | 1/2004 | McGee et al. | 345/173 |
| 7,007,235 | B1* | 2/2006 | Hussein et al. | 715/751 |
| 7,394,459 | B2* | 7/2008 | Bathiche et al. | 345/175 |
| 7,707,249 | B2* | 4/2010 | Spataro et al. | 709/205 |
| 7,904,323 | B2* | 3/2011 | Wynn et al. | 715/751 |

(Continued)

OTHER PUBLICATIONS

Thomas Hettel et al., "Operational Transformation for Models," May 26, 2010, 42 pages.

(Continued)

*Primary Examiner* — Ryan Barrett
(74) *Attorney, Agent, or Firm* — Fish & Richardson P.C.

(57) ABSTRACT

The present disclosure is directed to systems and methods including providing a data structure stored in computer-readable memory at a first location, monitoring a first work surface provided at the first location, determining that a first physical medium has been manipulated on the first work surface, and, in response, generating a first operation based on a manipulation of the first physical medium, applying the first operation to the data structure. Systems and methods can further include receiving operation and object data from a server system, the operation and object data corresponding to a second operation generated in response to manipulation of a second physical medium on a second work surface provided at a second location, applying the second operation to the data structure, processing the object data, and projecting a first virtual medium on the first work surface, the first virtual medium corresponding to the second physical medium.

19 Claims, 7 Drawing Sheets

(56) References Cited

U.S. PATENT DOCUMENTS

| | | | |
|---|---|---|---|
| 2006/0053380 A1* | 3/2006 | Spataro et al. | 715/753 |
| 2007/0124370 A1* | 5/2007 | Nareddy et al. | 709/204 |
| 2007/0176780 A1* | 8/2007 | Hart | G06F 3/01 340/572.1 |
| 2008/0133736 A1* | 6/2008 | Wensley et al. | 709/224 |
| 2008/0281851 A1* | 11/2008 | Izadi et al. | 707/102 |
| 2008/0319813 A1* | 12/2008 | du Preez et al. | 705/7 |
| 2009/0019367 A1* | 1/2009 | Cavagnari et al. | 715/716 |
| 2009/0234721 A1* | 9/2009 | Bigelow et al. | 705/12 |
| 2009/0235181 A1* | 9/2009 | Saliba et al. | 715/753 |
| 2009/0243957 A1* | 10/2009 | Ni et al. | 345/1.1 |
| 2009/0260060 A1* | 10/2009 | Smith et al. | 726/3 |
| 2009/0271691 A1* | 10/2009 | Brush et al. | 715/201 |
| 2010/0017727 A1* | 1/2010 | Offer et al. | 715/753 |
| 2010/0192072 A1* | 7/2010 | Spataro et al. | 715/753 |
| 2010/0241972 A1* | 9/2010 | Spataro et al. | 715/753 |
| 2010/0257457 A1* | 10/2010 | De Goes | 715/751 |
| 2010/0318470 A1* | 12/2010 | Meinel | G06Q 10/00 705/300 |
| 2011/0078246 A1* | 3/2011 | Dittmer-Roche | 709/205 |
| 2011/0087738 A1* | 4/2011 | Bartram et al. | 709/205 |
| 2011/0154192 A1* | 6/2011 | Yang et al. | 715/256 |
| 2011/0197132 A1* | 8/2011 | Escoda et al. | 715/733 |
| 2011/0208807 A1* | 8/2011 | Shaffer | 709/203 |
| 2011/0239133 A1* | 9/2011 | Duffus et al. | 715/753 |
| 2011/0239134 A1* | 9/2011 | Spataro et al. | 715/753 |
| 2011/0239135 A1* | 9/2011 | Spataro et al. | 715/753 |
| 2011/0252312 A1* | 10/2011 | Lemonik et al. | 715/255 |
| 2011/0270824 A1* | 11/2011 | Morris et al. | 707/722 |
| 2012/0084215 A1* | 4/2012 | Trier et al. | 705/301 |
| 2012/0096394 A1* | 4/2012 | Balko et al. | 715/790 |
| 2012/0331395 A2* | 12/2012 | Kummerfeld et al. | 715/750 |
| 2017/0201721 A1* | 7/2017 | Hailpern | H04N 7/157 |

OTHER PUBLICATIONS

Scott R. Klemmer, "Integrating Physical and Digital Interactions," *Computer*, vol. 38, Issue 10, Oct. 2005, pp. 111-113.

Scott R. Klemmer et al., "Integrating Physical and Digital Interactions on Walls for Fluid Design Collaboration," *Human-Computer Interaction*, vol. 23, 2008, pp. 138-213.

Scott R. Klemmer et al., "Toolkit Support for Integrating Physical and Digital Interactions," .*Human-Computer Interaction*, vol. 24, Issue 3, 2009, pp. 315-366.

Scott R. Klemmer et al., "The Designers' Outpost: A Tangible Interface for Collaborative Web Site Design," Proceedings of the 14th Annual ACM Symposium on User Interface Software Technology, UIST2001, Nov. 11-14, 2011, pp. 1-10.

Katherine M. Everitt et al., "Two Worlds Apart: Bridging the Gap Between Physical and Virtual Media for Distributed Design Collaboration," Proceedings of the CHI 2003 Conference on Human Factors in Computing Systems, Apr. 5-10, 2003, pp. 1-8.

\* cited by examiner

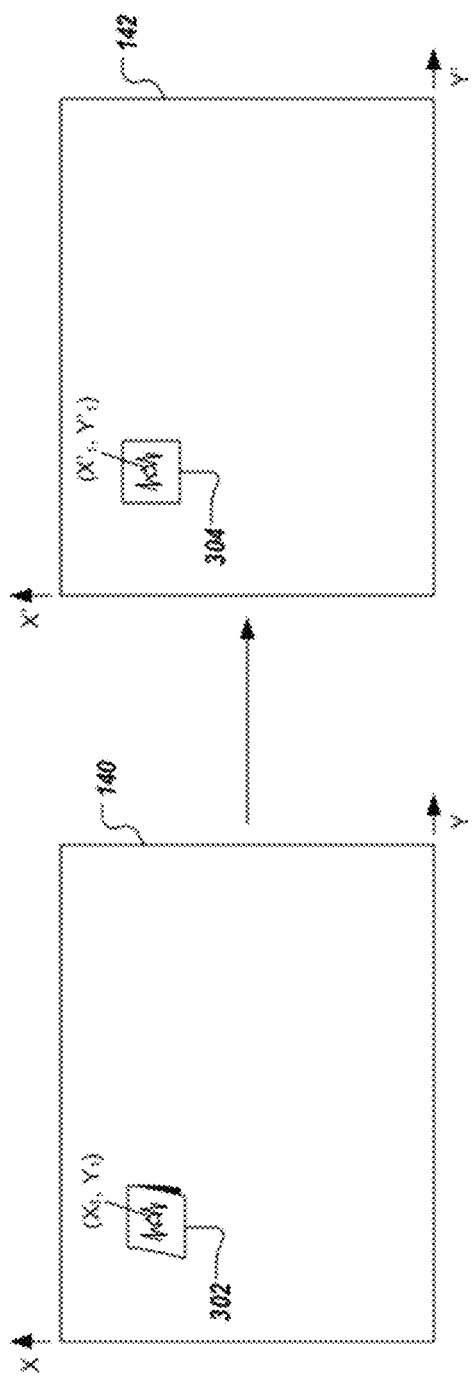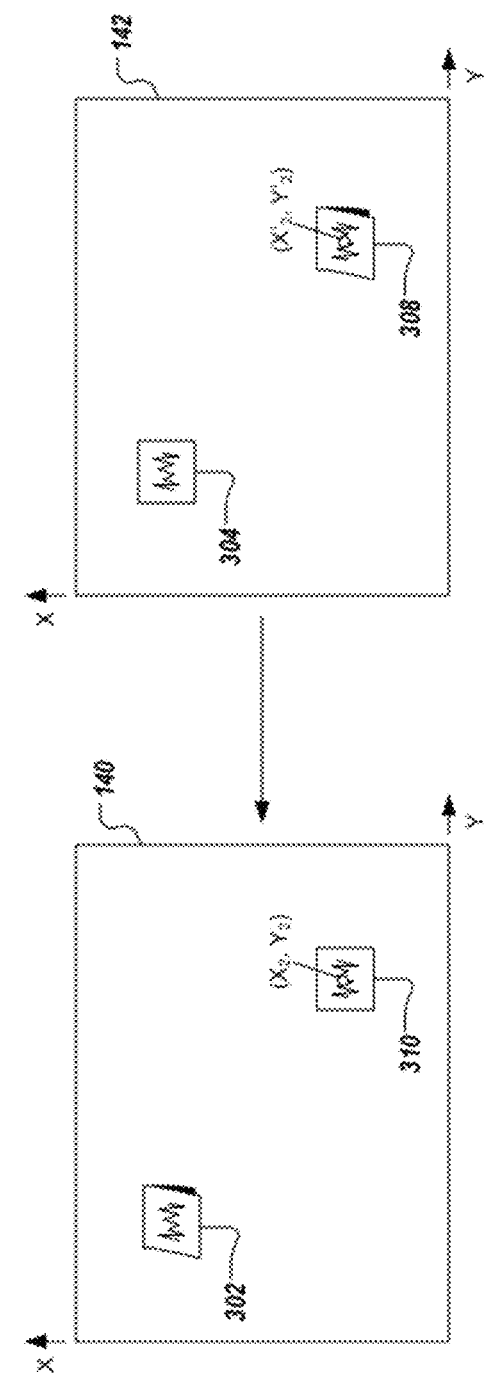

SYSTEMS AND METHODS FOR AUGMENTING PHYSICAL MEDIA FROM MULTIPLE LOCATIONS

BACKGROUND

Collaborative teams are often formed to brainstorm and produce some type of output. For example, collaborative teams can work together to in a creative environment to develop a layout of a website or to define a business process. Early stages of discussion in creative environments often benefit from a "pen and packing paper" approach, during which team members each contribute to the collaborative effort using traditional brainstorming tools such as a whiteboard, markers, pens and sticky notes.

In some situations, members of a collaborative team can be remotely located from one another. For example, one or more team members can be working at a first location and one or more team members can be working at a second location that is some distance from the first location (e.g., on a different continent). Collaboration tools have been developed to enable remotely located team members to partake in collaborative efforts. Such traditional tools, however, do not enable team members to use the above-mentioned traditional brainstorming tools to share information and collaborate with other team members at remotes locations. Consequently, team members that are virtually participating in a collaborative exercise are practically blind to events once the activity begins.

SUMMARY

Implementations of the present disclosure are directed to systems and methods that enable collaborative team members to user traditional brainstorming tools (e.g., whiteboards, markers, pens and sticky notes) in situations where one or more team members may be participating from a remote location. Remotely located team members can be deemed to be virtual participants in the collaborative effort. Systems and methods of the present disclosure enable virtual participants to receive information and to actively collaborate with other team members from the remote location.

Implementations of the present disclosure include operations of providing a data structure stored in computer-readable memory of a computing device located at a first location, monitoring a first work surface provided at the first location, determining that a first physical medium has been manipulated on the first work surface, in response to determining that the first physical medium has been manipulated, generating a first operation based on a manipulation of the first physical medium, applying the first operation to the data structure, and transmitting the first operation to a server system.

In some implementations, methods further include generating an image of the first physical medium, and transmitting the image of the first physical medium to the server system.

In some implementations, methods further include receiving an acknowledgment at the computing device, the acknowledgement indicating that a consistency data structure maintained at the server system has been updated based on the first operation.

In some implementations, methods further include receiving, at the computing device, operation and object data from the server system, the operation and object data corresponding to a second operation generated in response to manipulation of a second physical medium on a second work surface provided at a second location, applying the second operation to the data structure, processing the object data, and projecting a first virtual medium on the first work surface, the first virtual medium corresponding to the second physical medium. In some implementations, the object data includes a uniform resource indicator (URI) corresponding to an image of the second physical medium and position data corresponding to a position of the second physical medium on the second work surface.

In some implementations, methods further include determining that a second physical medium has been manipulated on the first work surface, in response to determining that the second physical medium has been manipulated, generating a second operation based on a manipulation of the second physical medium, applying the second operation to the data structure, and transmitting the second operation to a server system. In some implementations, methods further include receiving a third operation from the server system, the third operation conflicting with the second operation, undoing the second operation from the data structure, and applying the third operation to the data structure.

In some implementations, determining that the first physical medium has been manipulated on the first work space includes determining that the first physical medium has been added to the first work space. In some implementations, the first operation includes generating an object that corresponds to the first physical medium and augmenting the data structure to include the object.

In some implementations, determining that the first physical medium has been manipulated on the first work space includes determining that the first physical medium has been removed from the first work space. In some implementations, the first operation includes deleting an object from the data structure.

In some implementations, determining that the first physical medium has been manipulated on the first work space includes determining that the first physical medium has been modified. In some implementations, the first operation includes modifying an attribute of an object of the data structure.

In some implementations, the data structure includes a model, the model including objects and relationships between objects. In some implementations, the model includes at least one of a business process modeling notation (BPMN) model and a uniform modeling language (UML) model.

In some implementations, monitoring the first work surface is achieved using a digital camera, the digital camera generating image data corresponding to the first work surface. In some implementations, the digital camera is a component of the first computing device.

In some implementations, methods further include generating a virtual medium corresponding to the first physical medium, and projecting the virtual medium onto the first work surface in place of the first physical medium.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

FIGS. 3A-3C depict a progression of an example collaboration.

Like reference symbols in the various drawings indicate like elements.

DETAILED DESCRIPTION

Implementations of the present disclosure are directed to systems and methods that enable collaborative team members to use standard hardware and traditional brainstorming tools (e.g., whiteboards, markers, pens and sticky notes) in situations where one or more team members may be participating from a remote location. Remotely located team members can be deemed to be virtual participants in the collaborative effort. Systems and methods of the present disclosure enable virtual participants to receive information and to actively collaborate with other team members from the remote location. That is, implementations of the present disclosure enable local team members to share and manipulate "pen and paper" information on a traditional whiteboard, for example, with remotely located team members that are participating as virtual participants. Each team member in the collaboration, whether local or virtual, can be active in the collaboration (e.g., any team member can contribute to or modify the whiteboard contents) and changes are simultaneously replicated at all locations. Accordingly, physical media (e.g., sticky notes, pen markings on a whiteboard, etc.) can be placed on a whiteboard in one location and are simultaneously augmented onto whiteboards and/or computer screens at other locations. In other words, physical media in one setting can be replicated in one or more other locations and vice versa.

Figure 1:
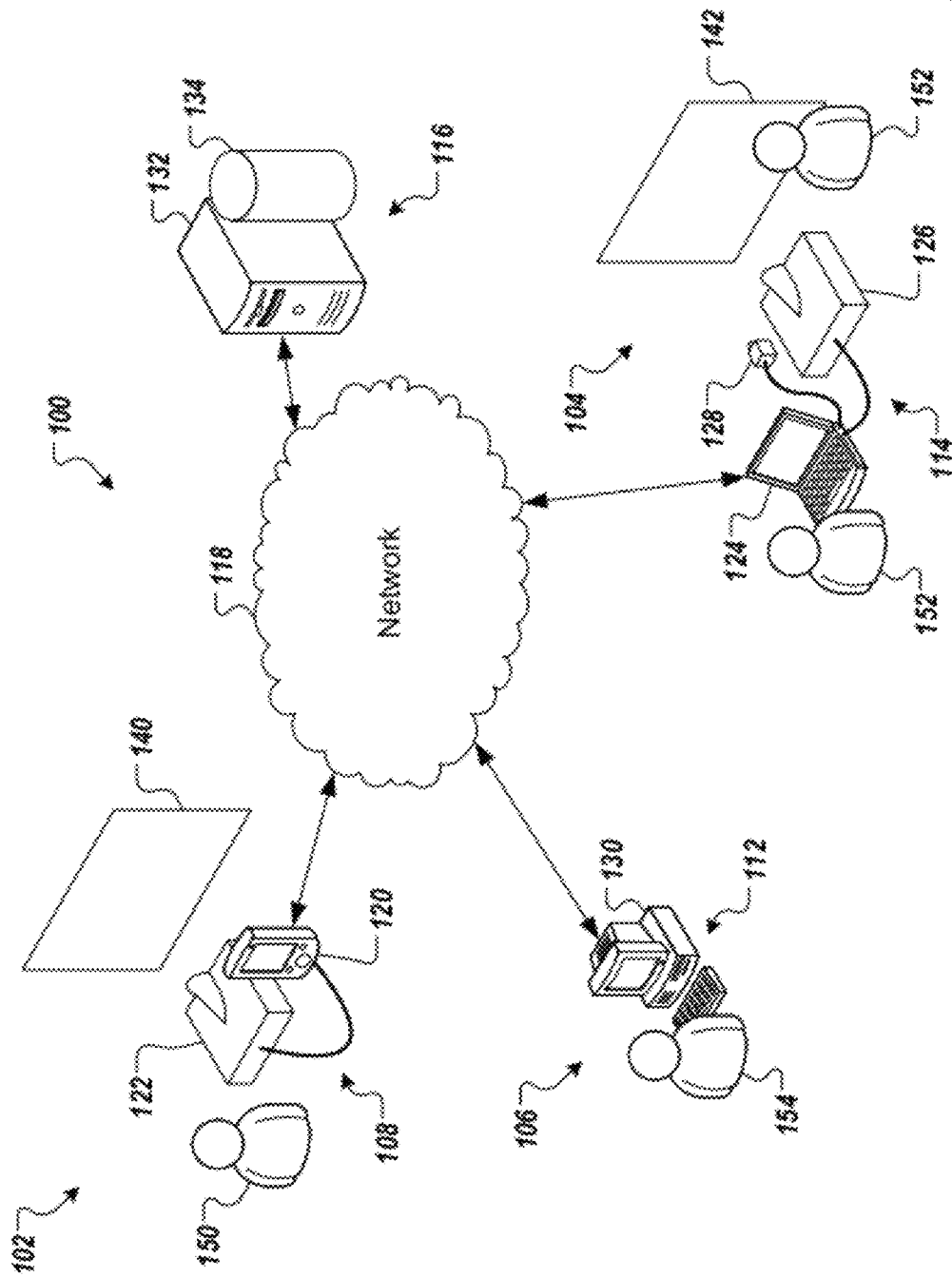
FIG. 1 depicts an example system in accordance with implementations of the present disclosure.

FIG. 1 depicts an example system 100 in accordance with implementations of the present disclosure. As discussed in further detail herein, and using the system 100 as an illustrative example, implementations of the present disclosure can be realized using traditional hardware components. Example hardware components can include computing devices, digital cameras and digital projectors. The digital cameras can each be provided as a high-resolution camera and can be provided as a still camera and/or a video camera. Accordingly, an image captured by a digital camera is of sufficient resolution such that the image is machine-readable to detect and read content captured in the image. For example, if physical media (e.g., a sticky note) includes text and is placed on a work surface, the digital camera should be able to capture an image of the physical media and process the text to reproduce the text in digital form.

The example system 100 includes a first location 102, a second location 104 and a third location 106. The example system 100 further includes hardware devices 108, 112, 114, located at the first location 102, second location 104 and third location 106, respectively, a server system 116 and a network 118. The hardware devices 108 include a computing device 120 and a digital projector 122. The hardware devices 110 include a computing device 124, a digital projector 126 and a digital camera 128. The hardware devices 114 include a computing device 130.

The computing devices 120, 124, 130 can each include any appropriate type of computing device such as a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. In the example system 100 of FIG. 1, the computing device 120 is depicted as a smart phone, the computing device 124 is depicted as a laptop computer and the computing device 130 is depicted as a desktop computer.

The computing devices 120, 124, 130 can communicate with one another and/or the server system 116 over the network 118. The network 118 can include a large computer network, such as a local area network (LAN), a wide area network (WAN), the Internet, a cellular network, or a combination thereof connecting any number of mobile computing devices, fixed computing devices and server systems. The server system 116 can include one or more computing devices 132 and one or more machine-readable repositories, or databases 134.

With particular reference to the first location 102, the computing device 120 is in communication with the digital projector 122, and a work surface 140 is provided. An example work surface can include a whiteboard and/or a sheet of paper (e.g., packing paper) hung on a wall. As noted above, the computing device 120 is depicted as a smart phone and is in communication with other computing devices through the network 188. The computing device 120 can include an integrated digital camera that can be provided as a still camera and/or a video camera. The digital camera can be arranged to capture images of the work surface 140, as discussed in further detail below. The digital projector 122 can be arranged to project images onto the work surface 140.

With particular reference to the second location 104, the computing device 124 is in communication with the digital projector 126 and the digital camera 128, and a work surface 142 is provided. An example work surface can include a whiteboard and/or a sheet of paper (e.g., packing paper) hung on a wall. As noted above, the computing device 124 is depicted as a laptop and is in communication with other computing devices through the network 118. The digital camera 128 can be provided as a still camera and/or a video camera. The digital camera 128 can be arranged to capture images of the work surface 142, as discussed in further detail below. The digital projector 126 can be arranged to project images onto the work surface 142.

One or more team members 150 can be present at the first location 102, one or more team members 152 can be present at the second location 104 and one or more team members 154 can be present at the third location 106. The one or more team members 150, 152 of the first location 102 and the second location 104, respectively, can be deemed to be active participants in the collaboration in that physical media is locally available to participate in the collaborative effort. The one or more team members 154 of the third location 106 can be deemed to be virtual participants in that they are not using physical media to physically participate in the collaboration.

Each of the work surfaces can be considered a graphical editor that can be used to perform a sequence of operations. Each operation can include a plurality of underlying, primitive operations. An example operation can include adding a sticky note to a work surface, the sticky note indicating the additional of an activity. Continuing with this example, example primitive operations can include creating a new object, setting one or more properties of the object, and adding the object to an object pool. In the context of collaboration, the operations have to preserve the intention of the team member and are therefore applied in their entireties or not at all. Further, operations of other team members have to be seen in the light of another team member's changes. Therefore, a team member would have to transform other transform other team member operations against his own operations.

Implementations of the present disclosure use operational transformation (OT) to maintain consistency of distributed documents which are subject to concurrent changes, and to support real-time collaborative editing of software models (e.g. uniform modeling language (UML), business process modeling notation (BPMN), etc.). In particular, a collaborative effort can include an underlying model that is manipulated by editing, adding, deleting and/or connecting, for example, objects of the model. In accordance with the present disclosure OT enables synchronization of the work surfaces (e.g., as graphical editors) and their underlying data structure (i.e., the model). Each computing device can maintain a local model of the respective work surfaces. In some implementations, the computing devices manipulate the models by correlating team member action (e.g., adding a sticky note, subtracting a sticky note) into complex operations. Through an OT process, discussed in further detail herein, a complex operation is transformed into its constituent primitive operations, while preserving the team member's intention.

In accordance with OT, the underlying data structure (i.e., the model) is manipulated based on the primitive operations. The primitive operations are subject to the operational transformation, to synchronize the model across the clients (e.g., the computing devices 120, 124, 130) and a central coordinator (e.g., the server system 116). Operational transformations specify how one operation (e.g., addition of a sticky note on the work surface 140) is to be transformed against another operation (e.g., deletion of a sticky note on the work surface 142). In some implementations, operational transformations can include an inclusive transformation (IT) and an exclusive transformation (ET). An IT transforms two operations such that the resulting operation includes the effects of both operations. An ET transforms two operations such that the effects of one operation are excluded by the other operation.

The clients each execute software for recognizing and translating physical operations as graphical editor operations for visualizing and manipulating the underlying object graph through complex editor operations made up of primitive operations. The server system is not required to be aware of the editor operations, which can be dependent on the actual application domain. In this manner, the server system can handle various modeling languages (e.g., UML, BPMN, and/or any domain specific language).

Each client (e.g., computing devices 120, 124, 130 of FIG. 1) conforms to a client protocol. Before discussing details of the client protocol, general activities of a client are discussed. Upon recognizing the occurrence of a complex operation, a client performs the complex operation on the local model. For example, after a sticky note is added to the work surface 140, the computing device 120 generates an activity corresponding to the sticky note and augments the local model that is maintained by the computing device 120. After the client has augmented the local model, the client transmits the complex operation to the server (e.g., the server system 116 of FIG. 1). After transmitting the complex operation to the server, the client waits for an acknowledgment from the server before being able to submit more operations. In some implementations, the client can queue complex operations to enable the client to be responsive to team member interactions and keep changing the local model without the acknowledgment from the server.

With regard to details of the client protocol, once a client generates a complex operation (e.g., add a new activity) an apply procedure is called and the operation is passed. Here it is assumed that no other changes to the local model can be made between the generation of an operation and calling the apply procedure. The client executes the operation on the local model, adds the operation to a local operation history and to a queue of pending operations. If the client is currently not waiting for an acknowledgment from the server (e.g., in response to a previous operation), the client sends the queue to the server and waits for an acknowledgment. If the client is waiting for an acknowledgment from the server (e.g., in response to a previous operation), the operation is added to the queue to be sent later.

The server can notify a client (e.g., computing device 124 of FIG. 1) of a sequence of operations to be applied by the client to a local model of the client. The client receives operations via a receive procedure. Upon receiving operations from the server, the client applies the operations in the sequence to augment the local model. If any of the operations sent by the server are in conflict with operations that have already been locally applied by the client, the previously applied, conflicting operations are undone, and the operations provided by the server are applied. This means that the queue of pending operations to be sent and/or acknowledged by the server also may have changed such that operations that have been undone are removed from the queue as well.

Another way for the server to interact with a client is by acknowledging the receipt and the successful transformation and application of an operation originating from the particular client. This is achieved by calling an acknowledge procedure on the client. The acknowledged operations are removed from the list of to be acknowledged operations. If the queue of pending operations is not empty, the operations are sent to the server.

The server (e.g., server system 116 of FIG. 1) conforms to a server protocol. Before discussing details of the server protocol, general activities of the server are discussed. The server receives a complex operation from a client and applies the complex operation to the model maintained at the server. The server transmits transformed operations to all other clients. The server only transmits operations that have been transformed against a local history of operations at the server, and transmits an acknowledgment to the client that originally sent the operation. In this manner, clients only transform operations back until the last acknowledgment.

With regard to details of the server protocol, the server protocol can include a receive procedure, which is called to initiate transmission of a sequence of complex operations to the server. A client that sends operations to the server identifies itself by also passing a unique identifier (cid). The server translates the sequence of complex operations, one by one, and appends the result to a list of operations. If a conflict occurs, translation of the remaining operations is abandoned. The server acknowledges the receipt of original operations to the originating client and broadcasts the translated operations to the other clients.

Figure 2:
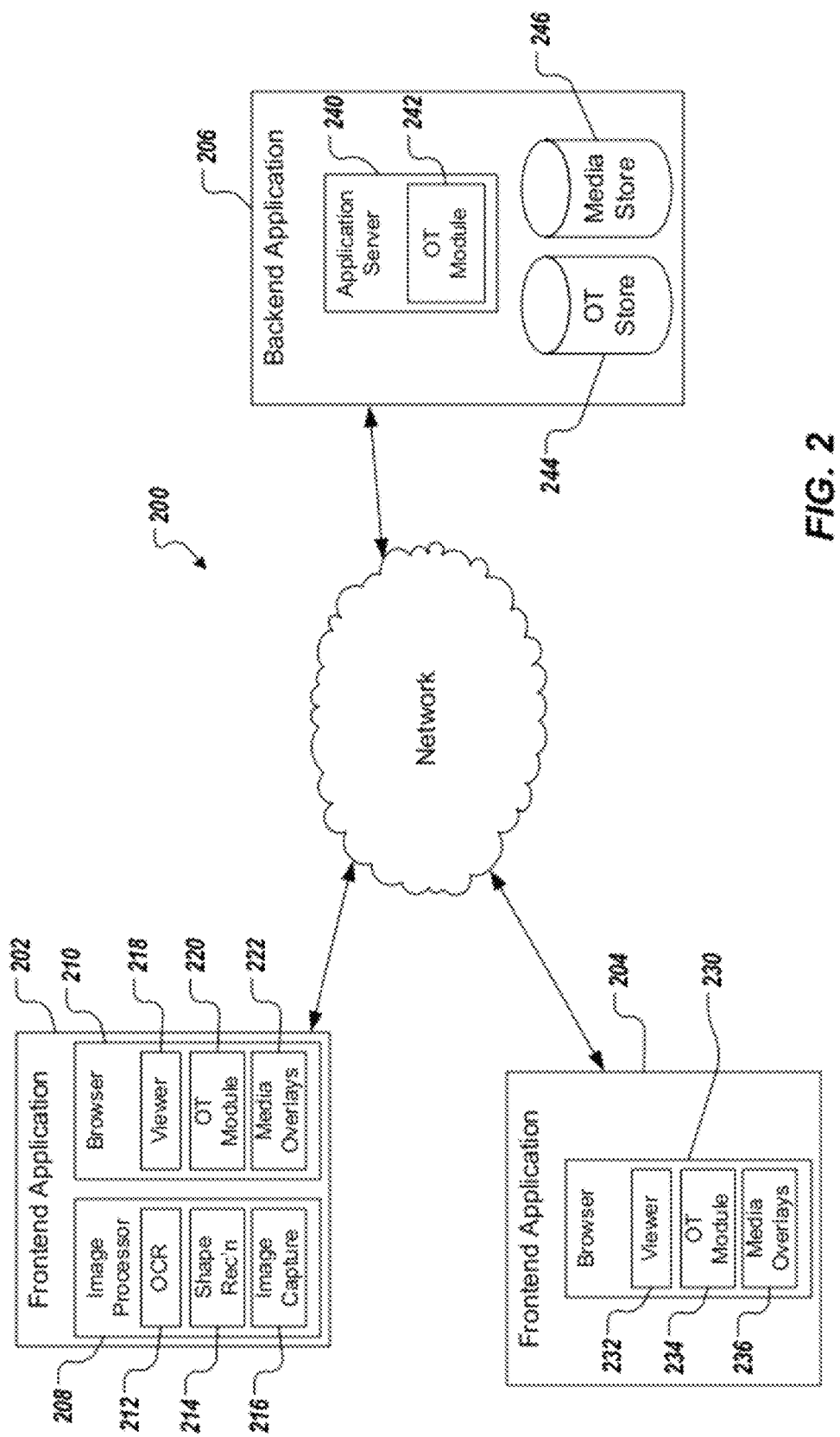
FIG. 2 is a block diagram of example components in accordance with implementations of the present disclosure.

FIG. 2 is a block diagram of example components 200 in accordance with implementations of the present disclosure. The example components 200 can each be provided as one or more software applications, application modules and/or sub-modules that can be executed using one or more processors. Each of the example components 200 is executed to perform functionality discussed herein.

The example components include a frontend application 202, a frontend application 204 and a backend application 206. The frontend application 202 can be executed on each of the computing devices 120, 124, for example, and can include one or more applications, application modules and/or sub-modules (e.g., a copy of the frontend application 202 can be executed on the computing device 120, and another copy of the frontend application 202 can be executed on the computing device 124). The frontend application 204 can be executed on the computing device 130, for example, and can include one or more applications, application modules and/or sub-modules. The backend application 206 can include one or more applications, application modules and/or sub-modules that are executed using the server system 116.

The frontend application 202 includes an image processor module 208 and a browser module 210. The image processor module 208 includes an object character recognition (OCR) sub-module 212, a shape recognition sub-module 214 and an image capture sub-module 216. The OCR sub-module 212 can be used to identify characters in text written by team members (e.g., team member 150, 152 of FIG. 1). The shape recognition sub-module 214 can be used to identify a shape of an item that is added to a work surface (e.g., a sticky note stuck to a whiteboard). The image capture sub-module 216 can be used to capture one or more images of an identified shape and to propagate changes to other computing devices.

The browser module 210 includes a viewer sub-module 218, an operational transformation (OT) sub-module 220 and a media overlay sub-module 222. The viewer sub-module 218 is used to process data and to initiate the display of content received from remote computing devices as a projection on a work surface. The OT sub-module 220 is a client-side sub-module that processes data to propagate all changes of a team member within the collaboration to all other team members involved. The media overlay sub-module 222 enables team members to overlay physical media (e.g., a sticky note, a notecard) with a map or video to provide different types of multi-media experiences as part of the collaboration (e.g., maps, videos, images, etc.).

In operation, and as discussed by way of example below, the digital cameras provide image data to the frontend application 202. The image processor module 208 of the frontend application 202 processes the image data and uses the shape recognition sub-module 214 to detect a new shape that has been added to the work surface. When a shape is detected, a position of the shape on the work surface is determined. In some implementations, the position can be provided using two-dimensional coordinates (e.g., x-, y-coordinates) of the work surface. The image processor module 208 uses the image capture sub-module 216 to generate an image of the shape. The frontend application 202 can store the image in computer-readable memory of the computing device, and transmits the image for storage at a backend server system (e.g., server system 116 of FIG. 1). The image can be stored in computer-readable memory of the server system, and can include a uniform resource identifier (URI) associated therewith. The URI can provide a unique identifier for the image and can provide an address as to where the image is stored.

In operation, and as discussed by way of example below, the OT sub-module 220 of the browser module 210 can subscribe to work surface changes in a publish/subscribe paradigm and receives change data corresponding to changes as they occur, are recognized and the change data is published. The viewer sub-module 218 of the browser module 210 processes the change data and generates instructions to display virtual content corresponding to physical content of remotely located work surfaces on a local work surface as an overlay to the existing, physical content already present on the local work surface. For example, the viewer sub-module 218 provides instructions and data to the projector (e.g., digital projectors 122, 126) to project virtual content onto the local work surface as an overlay to the physical content present on the local work surface. The media overlay sub-module 222 can process data corresponding to physical content present on the local work surface and can, based on the data, identify and provide digital content that can be overlaid on the physical content. For example, a sticky note can include writing that can be machine-read from an image of the sticky note. The writing can indicate a command to overlay digital content (e.g., a digital image, a digital video) on the work surface. In response to machine-reading of the writing, the media overlay sub-module 22 can identify the appropriate digital content, can retrieve the digital content (e.g., from a media store, discussed below), and can provide the digital content to the viewer sub-module 218 for projection onto the local work surface.

The frontend application 204 can include a browser module 230. The browser module 230 includes a viewer sub-module 232, an OT sub-module 234 and a media invocation sub-module 236. The viewer sub-module 232 is used to process data and to initiate the display of content from active participants (e.g., the one or more team members 150, 152 of FIG. 1) at a location. The OT sub-module 234 is a client-side component that processes data to propagate all changes of all users, active (e.g., the one or more team members 150, 152) or virtual (e.g., the one or more team members 154) to all other team members. The media invocation sub-module 236 enables a virtual participant (e.g., the one or more team members 154) to provide multi-media content as part of the collaboration (e.g., maps, videos, images).

In operation, and as discussed by way of example below, the OT sub-module 234 of the browser module 230 can subscribe to work surface changes in a publish/subscribe paradigm and receives data corresponding to changes as they occur, are recognized and the data is published. The viewer sub-module 232 of the browser module 230 processes the data and generates instructions to display content of remotely located work surfaces (e.g., the work surfaces 140, 142 of FIG. 1) on a display of a computing device (e.g., the computing device 130 of FIG. 1). The media overlay sub-module 236 enables team members to overlay physical media (e.g., a sticky note, a notecard) with a map or video to provide different types of multi-media experiences as part of the collaboration (e.g., maps, videos, images, etc.).

The backend application 206 can include an application server module 240 that includes an OT sub-module 242. The backend application 206 can include and/or communicate with an OT store 244 and a media store 246. The OT sub-module 242 is a server-side component that receives all changes from all client computing devices (e.g., computing devices 120, 124 and computing device 130), maintains a consistent state of the collaboration and propagates changes to all client computing devices accordingly. For example, the OT sub-module 242 can publish changes in the publish/subscribe paradigm. The OT store 244 can be provided in computer-readable memory (e.g., as a database) and can be used to persist all changes that occur during the collaboration. The media store 246 can be provided in computer-readable memory (e.g., as a database) and can be used to persist images (e.g., of the shapes detected on the work surfaces 140, 142) from the client computing devices (e.g., computing devices 120, 124) and other multi-media content (e.g., images, videos, audio recordings, etc.) generated or otherwise used during the collaboration.

Figure 3C:
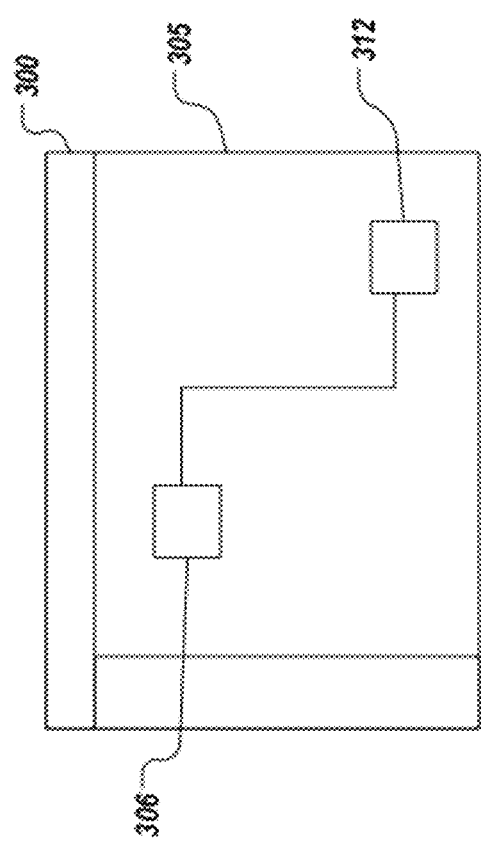

FIGS. 3A-3C depict a progression of an example collaboration. FIGS. 3A and 3B each depicts the work surface 140 at the first location 102 and the work surface 142 at the second location 104 of FIG. 1. FIG. 3C depicts a display screen 300 of the computing device 130 at the third location 106 of FIG. 1. In the example collaboration, physical content in the form of sticky notes are augmented to remote work surfaces, relative to a local work surface on which the physical content is applied. For example, a physical sticky note applied to the work surface 140 at the first location 102 (e.g., Brisbane, Australia) is augmented onto the work surface 142 at the second location 104 (e.g., Walldorf, Germany) as a virtual sticky note.

Initially, a session is instantiated between the computing devices that are used in the collaboration. In some implementations, instantiation of the session can include providing a local model at each of the computing devices participating in the session and a consistency model at the server system. Each model models objects and relationships between objects defined during the session. In some implementations, each model can be generated as a new model corresponding to a new session. In some implementations, each model can be retrieved from computer-readable memory and can correspond to a previous session (e.g., the current session is a continuation of the previous session).

With particular reference to FIG. 3A, a physical sticky note 302 is placed on the work surface 140 at the first location 102. Image data corresponding to the work surface 140 is generated by the digital camera of the computing device 120. The computing device 120, using the frontend application 202, processes the image data to recognize that a new shape has been detected on the work surface 140. A position $(X_1, Y_1)$ of the shape on the work surface 140 is determined. An image of the shape is captured and the image can be stored the image in computer-readable memory of the computing device 120, and is transmitted for storage at the backend server system 116. The image can be stored in computer-readable memory of the server system 116, and includes a corresponding URI. The backend server system 116 assigns the URI to the image data and propagates the URI to the computing devices 120, 124, 130. Generation of and assignment of the URI on the server-side ensures uniqueness of the URI.

The OT sub-module 220 translates the physical application of the sticky note 302 as an operation that is performed on the local model. In the instant example, addition of the sticky note 302 can be translated as the addition of a new object to the model. The operation can be committed to the local model of the computing device 120 and is transmitted to the server system 116.

The server system 116 receives the operation and executes the backend application to process the operation in view of a locally-stored history of operations and the consistency model. In particular, the OT sub-module 242 of the application server module 240 processes the operation to determine whether there is any conflict with previously received and committed operations. In the instant example, there is no conflict (i.e., the team members 150 add the sticky note 302 before any other activity is performed by other team members 152, 154). Consequently, the server system 116 augments the consistency model and transmits an acknowledgement to the originating computing device (i.e., the computing device 120). The server system 116 propagates the operation to each of the other computing devices (i.e., computing devices 124, 130), as well as the URI and position of the object.

The computing device 124 receives the operation and object data from the server system 116 and processes the operation and object data using the browser module 210. The computing device 124 generates image data based on the object data (i.e., the URI and the position) and provides the image data to the digital projector 126. The digital projector 126 projects a virtual sticky note 304 onto the work surface 142 at a position $(X'_1, Y'_1)$. The position $(X'_1, Y'_1)$ corresponds to the position $(X_1, Y_1)$. In this manner, the sticky note 302 from the first location 102 is augmented to the second location 104 as a virtual sticky note 304. In some implementations, the virtual sticky 304 note can include a color that is different from a color of the sticky note 302. The OT sub-module 220 processes the operation to update the local model of the computing device 124 (i.e., add a model object corresponding to the sticky note 302). In this manner, the local models of the computing devices 120, 124 and the consistency model of the server system 116 are synchronized.

The computing device 130 also receives the operation and object data from the server system 116 and processes the operation and object data using the browser module 230. The computing device 130 generates image data based on the object data (i.e., the URI and the position) and provides the image data to the display 300. The display 300 displays a virtual sticky note 306 on a virtual work surface 305 at a position corresponding to the position $(X_1, Y_1)$. In this manner, the sticky note 302 from the first location 102 is augmented to the third location 106 as the virtual sticky note 306. The OT sub-module 234 processes the operation to update the local model of the computing device 130 (i.e., add a model object corresponding to the sticky note 302). In this manner, the local model of the computing device 130 is synchronized with the local models of the computing devices 120, 124 and the consistency model of the server system 116.

With particular reference to FIG. 3B, a physical sticky note 308 is placed on the work surface 142 at the second location 104. Image data corresponding to the work surface 142 is generated by the digital camera 128 and is transmitted to the computing device 124. The computing device 124, using the frontend application 202, processes the image data to recognize that a new shape has been detected on the work surface 142. A position $(X'_2, Y'_2)$ of the shape on the work surface 142 is determined. An image of the shape is captured and the image can be stored the image in computer-readable memory of the computing device 124, and transmits the image for storage at the backend server system 116. The image can be stored in computer-readable memory of the server system 116, and includes a corresponding URI. The OT sub-module 220 of the frontend application 202 executed on the computing device 124 propagates the position $(X'_2, Y'_2)$ and the URI of the image to the server system 116.

The OT sub-module 220 translates the physical application of the sticky note 308 as an operation that is performed on the local model. In the instant example, addition of the sticky note 308 can be translated as the addition of a new object to the model. The operation can be committed to the local model of the computing device 124 and is transmitted to the server system 116.

The server system 116 receives the operation and executes the backend application to process the operation in view of the locally-stored history of operations and the consistency model. In particular, the OT sub-module 242 of the application server module 240 processes the operation to determine whether there is any conflict with previously received and committed operations. In the instant example, there is no conflict (i.e., the team members 152 add the sticky note 308 after addition of the sticky note 302 and before any other activity is performed by other team members 150, 154). Consequently, the server system 116 augments the consistency model and transmits an acknowledgement to the originating computing device (i.e., the computing device 124). The server system 116 propagates the operation to each of the other computing devices (i.e., computing devices 120, 130), as well as the URI and position of the object.

The computing device 120 receives the operation and object data from the server system 116 and processes the operation and object data using the browser module 210. The computing device 120 generates image data based on the object data (i.e., the URI and position) and provides the image data to the digital projector 122. The digital projector 122 projects a virtual sticky note 310 onto the work surface 140 at a position $(X_2, Y_2)$. The position $(X'_2, Y'_2)$ corresponds to the position $(X_2, Y_2)$. In this manner, the sticky note 308 from the second location 104 is augmented to the first location 102 as the virtual sticky note 310. In some implementations, the virtual sticky note 310 can include a color that is different from a color of the sticky note 308. The OT sub-module 220 processes the operation to update the local model of the computing device 120 (i.e., add a model object corresponding to the sticky note 308). In this manner, the local models of the computing devices 120, 124 and the consistency model of the server system 116 are synchronized.

The computing device 130 also receives the operation and object data from the server system 116 and processes the object data using the browser module 230. The computing device 130 generates image data based on the object data (i.e., the URI and position) and provides the image data to the display 300. The display 300 displays a virtual sticky note 312 on the virtual work surface 305 at a position corresponding to the position $(X'_2, Y'_2)$. In this manner, the sticky note 308 from the second location 104 is augmented to the third location 106. The OT sub-module 234 processes the operation to update the local model of the computing device 130 (i.e., add a model object corresponding to the sticky note 308). In this manner, the local model of the computing device 130 is synchronized with the local models of the computing devices 120, 124 and the consistency model of the server system 116.

As discussed herein, the position and movement of physical media (e.g., sticky notes, notecards), writing, relationships (e.g., hand-drawn links between physical media) and other physical media placed on the whiteboards are recognized as operations performed on a model within the context of a graphical editor. Each operation is processed to replicate a physical object with an electronic image equivalent and to manipulate a model object and/or a relationship between model objects. In some implementations, a physical object can be replaced by a virtual object. For example, and continuing with the example of FIGS. 3A-3C, a virtual representation of the physical sticky note 302 can be projected onto the work surface 140, such that the physical sticky note 302 can be removed from the work surface without affecting the underlying model. Physical objects placed on a work surface (e.g., either a physical work surface or a virtual work surface) can be manipulated (e.g., deleted, moved, edited, etc.) at any location. Information placed on a work space can also be stored electronically as long-term documentation.

Figure 4:
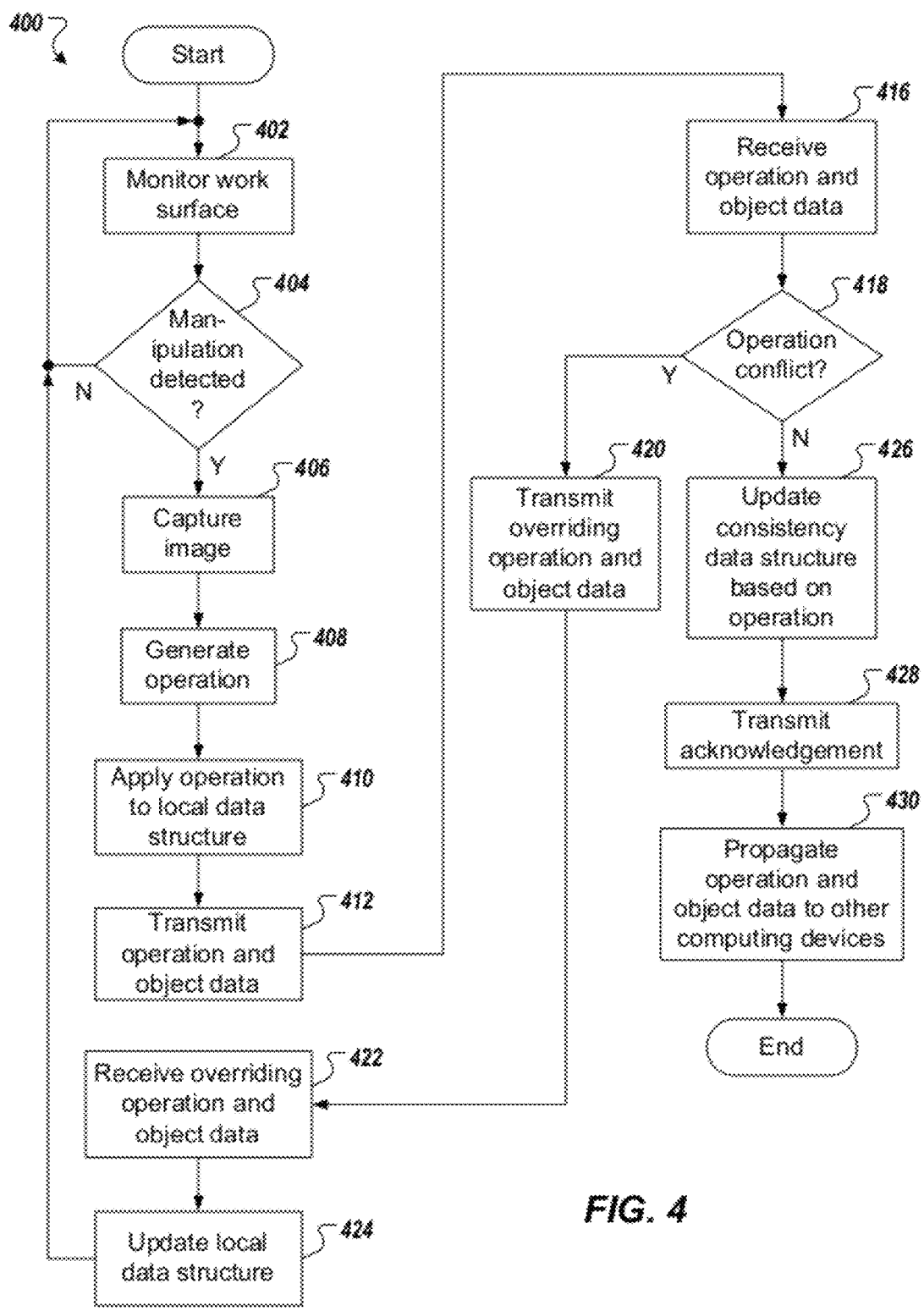
FIG. 4 is a flowchart of an example process that can be executed in accordance with implementations of the present disclosure.

FIG. 4 is a flowchart of an example process 400 that can be executed in accordance with implementations of the present disclosure. The example process 400 includes example operations 402-430 that can be executed using one or more computer applications, application modules and/or sub-modules using computing devices. In some implementations, for example, operations 402-412, 422 and 424 can be executed by the computing devices 120, 124 of FIG. 1, operations 408-412, 422 and 424 can be executed by the computing device 130 of FIG. 1, and operations 416-420 and 426-430 can be executed by the server system 116 of FIG. 1.

A work surface is monitored (402). For example, the computing device 120 can monitor the work surface 140, and/or the computing device 124 can monitor the work surface 142. It is determined whether a manipulation of the work surface is detected (404). For example, the computing device 120 can detect whether the work surface 140 has been manipulated (e.g., addition, deletion, modification of a physical medium), and/or the computing device 124 can detect whether the work surface 142 has been manipulated (e.g., addition, deletion, modification of a physical medium). If a manipulation of the work surface is not detected, the example process 400 loops back.

If a manipulation of the work surface is detected, an image corresponding to the manipulation is captured (406). For example, the computing device 120 can capture an image of a physical medium on the work surface 140, and/or the computing device 124 can capture an image of a physical medium on the work surface 142. An operation corresponding to the manipulation is generated (408). For example, the computing device 120 can generate an operation, and/or the computing device 124 can generate an operation. Example operations can include generation of an object, deletion of an object and modification of an object.

The operation is applied to a local data structure. For example, the computing device 120 can apply the operation to a local data structure that is stored and maintained by the computing device 120, and/or the computing device 124 can apply the operation to a local data structure that is stored and maintained by the computing device 124. The operation and corresponding object data are transmitted (412). For example, the computing device 120 and/or the computing device 124 can transmit the operation to the server system 116.

The operation and the object data are received (416). For example, the server system 116 receives the operation and object data. It is determined whether there is an operation conflict (418). For example, the server system 116 can process the operation in view of a history of operations to determine whether the received operation conflicts with a previous operation. If there is an operation conflict, the example process 400 continues at operation 420. An overriding operation and object data are transmitted (420). For example, the server system 116 can identify an overriding operation that conflicts with the received operation and can transmit the overriding operation and corresponding object data to the computing device that originally sent the operation (e.g., the computing device 120, or the computing device 124).

The overriding operation and object data are received (422). For example, the computing device 120 or the computing device 124 can receive the overriding operation and object data. The local data structure is updated based on the overriding operation and the object data (424), and the example process 400 loops back to operation (402). For example, the computing device 120 or the computing device 124 can undo the operation from the local data structure and apply the overriding operation to the local data structure.

If, in operation 418, there is no operation conflict, the example process continues at operation 426. A consistency data structure is updated based on the operation (426). For example, the server system 116 can store and maintain a consistency data structure (i.e., model) and can apply the operation to the consistency data structure. An acknowledgment is transmitted to the computing device that originally provided the operation (428). For example, the server system 116 can transmit an acknowledgement to the computing device 120 or the computing device 124. The operation and object data is propagated to other computing device (130). For example, if the computing device 120 originally provided the operation, the server system 116 can propagate the operation and object data to the computing device 124 and the computing device 130. In this manner, the local data structures at each of the computing devices can be synchronized.

Implementations of the present disclosure can be used in various use cases. For purposes of illustration, example use cases are discussed in detail herein. Example use cases can include a business process modeling use case, a business process modeling notation (BPMN) use case, a requirements engineering use case and a supply chain modeling use case.

Business process modeling is an activity used in enterprise management. In the early stages of business process modeling, designers (i.e., team members) often use a whiteboard and a set of sticky notes (potentially grouped, potentially linked, but not really formal) to define the initial process design. In these early stages, it is important to align views and extract process knowledge from participants. Implementations of the present disclosure (e.g., the example system 100) support of collaborative modeling, which enables every participant involved in the collaboration to be active. In other words, any team member can modify the work space design and this modification is replicated at other locations.

Figure 5B:
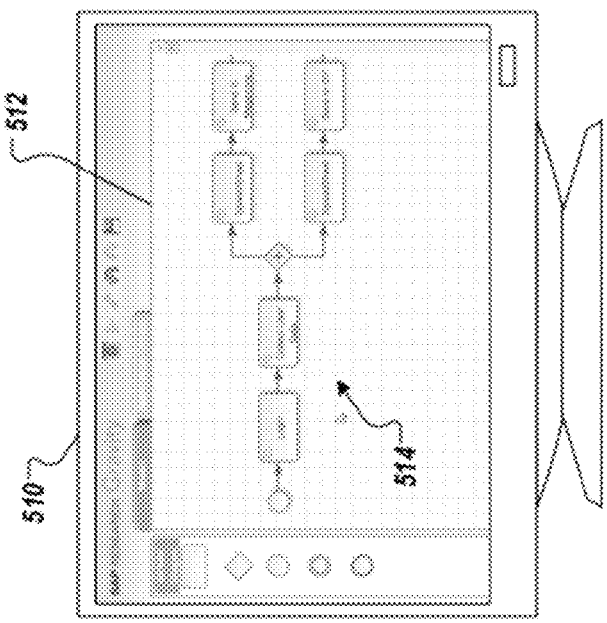
FIGS. 5A and 5B depict an example use case.
Figure 5A:
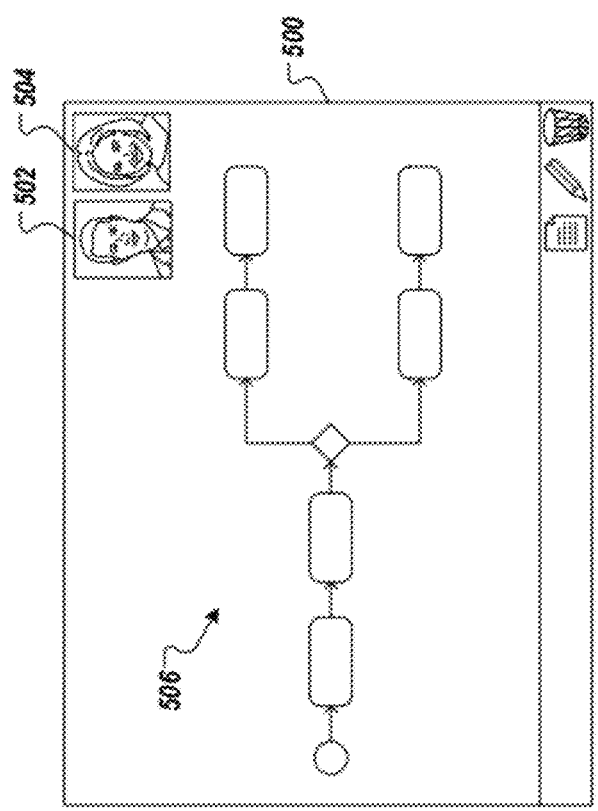

Referring now to FIGS. 5A and 5B, later business process design phases often occur on the computer, in a BPMN tool. An example BPMN tool includes Gravity provided by SAP AG of Walldorf, Germany. Implementations of the present disclosure enable the design layout resulting from early stage collaborative efforts to be captured in a model that can be imported directly into the BPMN tool. A business process expert can then take the imported model and generate a corresponding BPMN model (e.g., sticky notes can be transformed into BPMN activities).

FIG. 5A depicts an example workspace 500 that can be physically manipulated be a local team member (i.e., a team member that is present at the work space) and that can be virtually manipulated by remotely located team members 502, 504. The example work space 500 includes an example business process 506 depicted thereon. The example business process 506 can be captured in a model that can be imported to a BPMN tool. FIG. 5B depicts a display 510 displaying a BPMN environment 512 provided by a BPMN tool. A BPMN model 514 corresponding to the business process 506 is provided in the BPMN environment 512.

In the illustrated example of FIGS. 5A and 5B, the business process 506 can be provided on the work space 500 using process modeling notation, such as BPMN. In some implementations, the BPMN notation can be recognized by a computing device observing the work space 500 (e.g., the computing device 120 observing the work space 140 of FIG. 1). By recognizing the BPMN notation, the model can be originally created as a BPMN model and can be directly imported into the BPMN tool (e.g., in real time, as the BPMN model develops) without translation into a BPMN model that can be processed by the BPMN tool. In this manner, temporary work space diagrams are simultaneously stored as long-term documentation which can be kept for later use.

Another example use case includes requirements engineering. Requirements analysis is an initial process in software development projects. Stakeholders and developers are involved in the requirements analysis process in early stages. However, requirements analysis becomes complicated when team members are located in different offices, cities, or even countries. Implementations of the present disclosure enable remotely located team members to effectively participate in the requirements analysis. For example, developers and stakeholders in different locations can collaboratively author a use case diagram in UML notation. The results of the collaboration can be captured (e.g., in a UML model) and imported to a UML tool (e.g., in real time, as the UML model develops). An example UML tool includes Netweaver Developer Studio provided by SAP AG of Walldorf, Germany. In this manner, temporary work space diagrams are simultaneously stored as long-term documentation which can be kept for later use.

Another example use case can include supply chain modeling. Supply chain modeling involves the collaboration of multiple team members, which team members can be spread between multiple organizations. While collaboration inside one organization is already challenging when distributed team members are considered, collaboration among a number of organizations poses a greater challenge. An example situation in a supply chain is one where a potentially large number of stakeholders, through a value chain, contribute toward an end product. In order to maintain flexibility, team members can form ad-hoc business networks and respond to changing market conditions.

Implementations of the present disclosure support supply chain modeling, where heterogeneity of information systems of networked team members would traditionally inhibit team members from collaborating efficiently. Instead, the team members can freely model a supply chain using the standard collaboration methods, and after the process has concluded, each participant can import the model into their respective supply chain management systems for further detailing and processing. As one example, interoperability issues (e.g., business documents), which are often discussed outside of flow diagrams, can be discussed using methods and systems of the present disclosure. When a supply chain is to be remodeled, all value chain participants can come back to the original model and modify it according to the changed conditions and requirements.

It is appreciated that methods in accordance with the present disclosure can include any combination of the aspects and features described herein. That is to say, methods in accordance with the present disclosure are not limited to the combinations of aspects and features specifically described herein, but also include any combination of the aspects and features provided.

Figure 6:
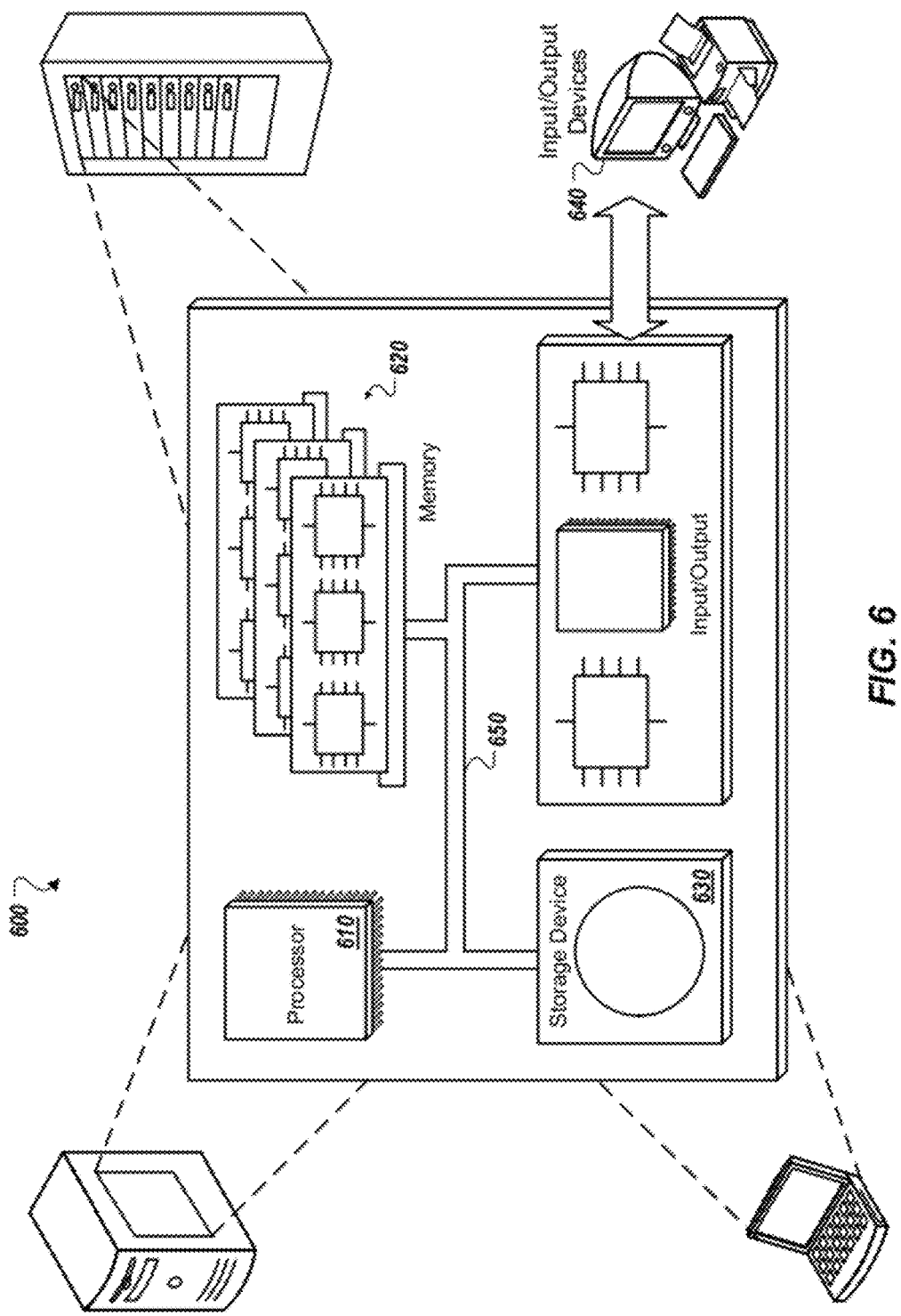
FIG. 6 is a schematic diagram of an example computing system that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for maintaining consistency of a plurality of data structures, the method comprising:
providing a first data structure of the plurality of data structures stored in computer-readable memory of a computing device located at a first location;
monitoring, by a digital camera, a first work surface provided at the first location, the digital camera generating images of the first work surface;
determining, by performing an object character recognition and a shape recognition of the images of the first work surface, that a first physical medium has been manipulated on the first work surface, wherein the first physical medium is different from the first work surface;
in response to determining that the first physical medium has been manipulated, generating a first operation based on a manipulation of the first physical medium;
providing a second data structure of the plurality of data structures based on a second work surface located at a second location, the second location being different than the first location, the first data structure and the second data structure being subject to active and simultaneous manipulation operations that define a collaborative effort;
applying the first operation to the first data structure, the first operation comprising a complex operation having a plurality of constituent primitive operations, wherein applying comprises performing an operational transformation on the plurality of constituent primitive operations, the operational transformation maintaining consistency between the first data structure and the second data structure; and
transmitting the first operation to a server system and replicating at the second location.

2. The method of claim 1, further comprising:
generating an image of the first physical medium; and
transmitting the image of the first physical medium to the server system.

3. The method of claim 1, further comprising:
receiving an acknowledgment at the computing device, the acknowledgement indicating that a consistency data structure maintained at the server system has been updated based on the first operation.

4. The method of claim 1, further comprising:
receiving, at the computing device, operation and object data from the server system, the operation and object data corresponding to a second operation generated in response to manipulation of the second physical medium on the second work surface provided at a second location;
applying the second operation to the second data structure;
processing the object data; and
projecting a first virtual medium on the first work surface, the first virtual medium corresponding to the second physical medium.

5. The method of claim 4, wherein the object data comprises a uniform resource indicator (URI) corresponding to an image of the second physical medium and position data corresponding to a position of the second physical medium on the second work surface.

6. The method of claim 1, further comprising:
determining that a second physical medium has been manipulated on the first work surface;
in response to determining that the second physical medium has been manipulated, generating a second operation based on a second manipulation of the second physical medium;
applying the second operation to the second data structure; and
transmitting the second operation to the server system.

7. The method of claim 6, further comprising:
receiving a third operation from the server system, the third operation conflicting with the second operation;
undoing the second operation from the second data structure; and
applying the third operation to the data structure.

8. The method of claim 1, wherein determining that the first physical medium has been manipulated on the first work surface comprises determining that the first physical medium has been added to the first work surface.

9. The method of claim 8, wherein the first operation comprises generating an object that corresponds to the first physical medium and augmenting the second data structure to include the object.

10. The method of claim 1, wherein determining that the first physical medium has been manipulated on the first work surface comprises determining that the first physical medium has been removed from the first work surface.

11. The method of claim 10, wherein the first operation comprises deleting an object from the second data structure.

12. The method of claim 1, wherein determining that the first physical medium has been manipulated on the first work surface comprises determining that the first physical medium has been modified.

13. The method of claim 12, wherein the first operation comprises modifying an attribute of an object of the second data structure.

14. The method of claim 1, wherein the second data structure comprises a model, the model comprising objects and relationships between objects.

15. The method of claim 14, wherein the model comprises at least one of a business process modeling notation (BPMN) model and a uniform modeling language (UML) model.

16. The method of claim 1, wherein the digital camera is a component of the computing device.

17. The method of claim 1, further comprising:
generating a virtual medium corresponding to the first physical medium; and
projecting the virtual medium onto the first work surface in place of the first physical medium.

18. A computer-readable storage device coupled to one or more processors and having instructions stored thereon which, when executed by the one or more processors, cause the one or more processors to perform operations for maintaining consistency of a plurality of data structures, the operations comprising:
providing a first data structure of the plurality of data structures stored in computer-readable memory of a computing device located at a first location;
monitoring, by a digital camera, a first work surface provided at the first location, the digital camera generating images of the first work surface;
determining, by performing an object character recognition and a shape recognition of the images of the first work surface, that a first physical medium has been manipulated on the first work surface, wherein the first physical medium is different from the first work surface;

in response to determining that the first physical medium has been manipulated, generating a first operation based on a manipulation of the first physical medium;

providing a second data structure of the plurality of data structures based on a second work surface located at a second location, the second location being different than the first location, the first data structure and the second data structure being subject to active and simultaneous manipulation operations that define a collaborative effort;

applying the first operation to the first data structure, the first operation comprising a complex operation having a plurality of constituent primitive operations, wherein applying comprises performing an operational transformation on the plurality of constituent primitive operations, the operational transformation maintaining consistency between the first data structure and the second data structure; and transmitting the first operation to a server system and replicating at the second location.

19. A system, comprising:

a computing device located at a first location; and a computer-readable storage device coupled to the computing device and having instructions stored thereon which, when executed by the computing device, cause the computing device to perform operations for maintaining consistency of a plurality of data structures, the operations comprising:

providing a first data structure of the plurality of data structures stored in computer-readable memory of the computing device;

monitoring, by a digital camera, a first work surface provided at the first location, the digital camera generating images of the first work surface;

determining, by performing an object character recognition and a shape recognition of the images of the first work surface, that a first physical medium has been manipulated on the first work surface, wherein the first physical medium is different from the first work surface;

in response to determining that the first physical medium has been manipulated, generating a first operation based on a manipulation of the first physical medium;

providing a second data structure of the plurality of data structures based on a second work surface located at a second location, the second location being different than the first location, the first data structure and the second data structure being subject to active and simultaneous manipulation operations that define a collaborative effort;

applying the first operation to the first data structure, the first operation comprising a complex operation having a plurality of constituent primitive operations, wherein applying comprises performing an operational transformation on the plurality of constituent primitive operations, the operational transformation maintaining consistency between the first data structure and the second data structure; and transmitting the first operation to a server system and replicating at the second location.

\* \* \* \* \*